INVENTORS
William B. Green &
Jean R. Fortier

United States Patent Office 3,005,867
Patented Oct. 24, 1961

3,005,867
HERMETICALLY SEALED SEMICONDUCTOR
DEVICES
William B. Green, Greensburg, and Jean R. Fortier, Irwin, Pa., assignors to Westinghouse Electric Corporation, East Pittsburgh, Pa., a corporation of Pennsylvania
Filed Oct. 30, 1959, Ser. No. 849,788
6 Claims. (Cl. 174—50.54)

The present invention is concerned with improvements in or relating to sealed electrical devices and to methods of fabrication thereof.

In known methods of fabricating sealed electrical devices comprising a support member mounting an electrical component, a metallic washer and a cap or header member, the metallic washer (usually formed by stamping or machining), was brazed to the support member, and subsequently, the cap or header member was welded to the washer member in an endeavor to obtain an air-tight enclosure between the washer member and the cap member. In addition to being an expensive procedure, a considerable number of these finished electrical devices proved to be inadequate and sometimes failed during performance tests owing to defects in the weld joining the cap member to the washer member. The reason for these defects was generally ascribed to the metallic washer, which, after the machining or stamping, was buckled or nonuniform in dimension along its circumference. Consequently, these imperfections presented a problem in aligning the washers on the support member and brazing the washer thereto and also in the subsequent welding of the cap member to the support member.

It has been a problem to produce such sealed devices by processes avoiding excessively high temperature development during the welding of the header member to the support member, so that the electrical element is not adversely affected.

Therefore, it is an object of the present invention to provide a reliable hermetically sealed electrical device in which a support of a good conductive metal mounting an electrical component such as a semiconductor member is provided with an inserted ferrous base metal ring to which a header is welded without developing temperatures sufficient to deteriorate the electrical component.

Another object of the invention is to provide for a process for producing a hermetically sealed semiconductor device comprising simultaneously soldering the semiconductor member and a thin ferrous base metal ring to a support member of a good conductive metal and thereafter welding a header member to the ferrous base metal ring without subjecting the semiconductor element to excessive temperatures during the welding.

Other objects of the invention will, in part, be obvious and will, in part, appear hereinafter.

In accordance with the present invention and attainment of the foregoing objects, there is provided a hermetically sealed electrical device having a thermally conductive support member of a metal selected from the group consisting of copper, copper base alloys, silver, silver base alloys, and aluminum and aluminum base alloys. The support member comprises a peripheral flange having a circular groove disposed in its upper periphery and a flat surfaced mounting portion centrally disposed to which an electrical component may be soldered. The peripheral flange and the mounting portion are separated by a circular channel. A circular ring member is inserted and hermetically sealed in the circular groove of the flanged portion of the support member so that it has a narrow projection above the upper surface of the flange. Thereafter, a header element having a laterally extending flange and an insulating segment is welded to the circular ring at the upper surface of the projection of the ring and the lower base of the laterally extending flange to provide a hermetic enclosure for the electrical component between the header element and the support member. The amount of heat developed during welding is insufficient to deteriorate the electrical component.

Figure 1:
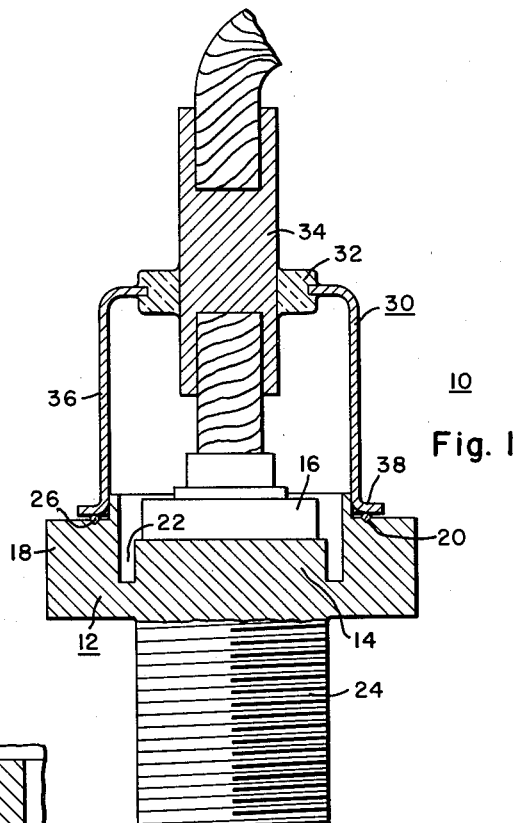
FIGURE 1 is a vertical section of a sealed electrical device.

Referring to FIG. 1, a sealed electrical device 10 according to the invention comprises a thermal contact and support member 12 of a metal selected from the group consisting of copper, copper base alloys, silver, silver base alloys, aluminum and aluminum base alloys. Copper and brass have been found particularly satisfactory for this purpose. The support member 12 comprises a centrally disposed flat surfaced mounting portion 14 in which an electrical component 16, for example, a semiconductor member, may be soldered thereto so that electrical current may be conducted thereto and heat may be dissipated to the support member. The electrical component is adversely affected by heating to a temperature above a predetermined level. The mounting portion 14 is circumscribed by a peripheral flange 18, the upper surface of the flange having a circular groove 20 disposed in its upper periphery, the flange is separated from the mounting portion by a circular channel 22.

On the opposite surface of the support member may be attached an electrical contact and thermal dissipating stud 24 to connect the support member to an electrical conductor and heat sink. As shown in FIG. 1, the stud portion is threaded to provide a convenient means for attachment. Other methods of attachment will be apparent to those skilled in the art.

Figure 2:
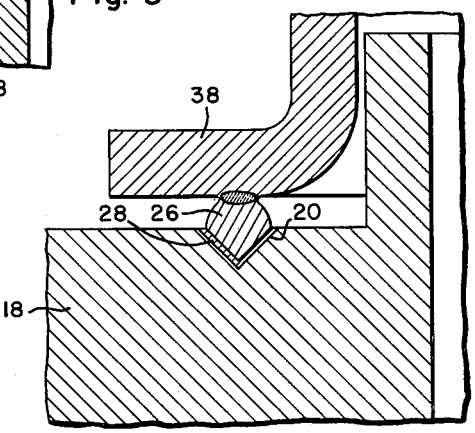
FIG. 2 is a greatly enlarged fragmentary sectional view showing the details of the lefthand portion of FIG. 1 adjacent to the circular ring member.

As shown in more detail in FIG. 2, a ferrous base circular ring member 26 fabricated from half rounds or tubing or by other means is inserted into the circular groove 20 of the peripheral flange of the support member and is soldered thereto at 28 providing a hermetic joint therebetween. The ring 26 presents a relatively narrow projection extending above the flange surface.

The ring member 26 and the electrical component 16 are soldered to the support member concurrently. The solders employed are preferably hard solders, such as silver base solders, for example, those disclosed in U.S. Patents 2,763,822 and 2,801,375, assigned to the assignee of the present invention. After the ring member and electrical component are soldered in place, a flanged ferrous base metal header element 30 comprising an insulating segment 32 with an electrical conductor 34 passing therethrough and a cylindrical shell 36 with a laterally extending horizontal flange 38, is disposed so that the flange 38 is in contact with the upper surface of the ring 26 to provide a hermetically sealed chamber.

The flange 38 is then subjected to a welding electrical current so as to weld it to the circular ring 26. Owing to both the full contact over the entire ring and the small cross sectional area of contact, very little heat is developed during welding so that the temperature of the electrical component does not rise to a value at which it will deteriorate.

The circular ring member such as 26 of the present invention may be conveniently and economically prepared by slicing sections of suitable width from steel tubing.

Figure 3:
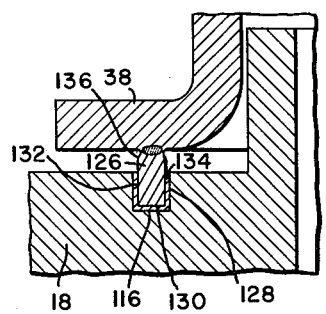
FIG. 3 is a greatly enlarged fragmentary view of a modified circular ring member mounting.

Referring to FIG. 3 of the drawing there is illustrated a ring of different configuration than that shown in FIG. 2 which may be prepared by machining sections from a tube. In the flange 18, a rectangular channel groove 116 is machined. A ring section 126 of a diameter to fit into channel 116 is machined from a thin walled steel tube. The section 126 comprises a flat bottom 130, vertical sides 132 and 134 and a projecting rounded upper end 136. A hard solder or brazing alloy 128 is applied to the channel 116 in order to braze the section 126 thereto. Thereafter the flange 38 is welded to the projection 136. It will be understood that the projecting upper end may be pointed or of triangular cross section, if desired.

Since certain changes in carrying out the above process and in the product embodying the invention may be made without departing from its scope, it is intended that the accompanying description and drawing be interpreted as illustrative and not limiting.

We claim as our invention:

1. A sealed electrical device comprising a good thermally conductive support member having a peripheral flange having an upper surface, the support member being a metal selected from the group consisting of copper, copper base alloys, silver, silver base alloys, and aluminum and aluminum base alloys; a heat sensitive electrical component mounted on one surface of the support member disposed within the periphery thereof so that heat may be dissipated to the support member, the electrical component being adversely affected by heating to a temperature above a predetermined level; a ferrous base metal ring member hermetically mounted on the upper surface of the peripheral flange of the support member, the ring member having a narrow circular projection extending above the upper surface of the flange; a header element containing an insulating segment and an electrical conductor passing through the insulating segment, the header element having a laterally extending ferrous base metal flange adapted to fit against the circular ring member, the laterally extending ferrous base metal flange being welded to the circular ring member to cooperate with the support member to provide a hermetic enclosure for the electrical component between the header member and the support member, the amount of heat developed during the welding of the ferrous flange to the narrow projection of the ferrous circular ring member being so small that the temperature of the electrical component does not reach the predetermined level which adversely affects the electrical component.

2. A sealed electrical device comprising a good thermally conductive support member having a peripheral flange having an upper surface, the support member being selected from the group consisting of copper, copper base alloys, silver, silver base alloys, and aluminum and aluminum base alloys; a heat sensitive electrical component mounted on one surface of the support member disposed within the periphery thereof so that heat may be dissipated to the support member, the electrical component being adversely affected by heating to a temperature above a predetermined level; a ferrous base metal ring member hermetically mounted on the upper surface of the peripheral flange of the support member, the ring member having a narrow circular projection extending above the upper surface of the flange; a header element containing an insulating segment and and electrical conductor passing through the insulating segment, the header element having a laterally extending ferrous base metal flange adapted to fit against the circular ring member, the laterally extending ferrous base metal flange being welded to the circular ring member to cooperate with the support member to provide a hermetic enclosure for the electrical component between the header member and the support member, the amount of heat developed during the welding of the ferrous flange to the narrow projection of the ferrous circular ring member being so small that the temperature of the electrical component does not reach the predetermined level which adversely affects the electrical component, a stud extending from the opposite surface of the support member for mounting the member on a heat sink.

3. A sealed electrical device comprising a good thermally conductive support member having a peripheral flange having an upper surface, the upper surface of the peripheral flange having a circular groove, the support member being selected from the group consisting of copper, copper base alloys, silver, silver base alloys, and aluminum and aluminum base alloys; a heat sensitive electrical component mounted on one surface of the support member disposed within the periphery thereof so that heat may be dissipated to the support member, the electrical component being adversely affected by heating to a temperature above a predetermined level; a ferrous base metal ring member hermetically mounted in the circular groove on the upper surface of the peripheral flange of the support member, the ring member having a narrow circular projection extending above the upper surface of the flange; a header element containing an insulating segment and an electrical conductor passing through the insulating segment; the header element having a laterally extending ferrous base metal flange adapted to fit against the circular ring member, the laterally extending ferrous base metal flange being welded to the circular ring member to cooperate with the support member to provide a hermetic enclosure for the electrical component between the header member and the support member, the amount of heat developed during the welding of the ferrous flange to the narrow projection of the ferrous circular ring member being so small that the temperature of the electrical component does not reach the predetermined level which adversely affects the electrical component.

4. A sealed electrical device comprising a good thermally conductive support member having a peripheral flange having an upper surface, the upper surface of the peripheral flange having a circular groove, the support member being selected from the group consisting of copper, copper base alloys, silver, silver base alloys, aluminum and aluminum base alloys; a heat sensitive electrical component mounted on one surface of the support member disposed within the periphery thereof so that heat may be dissipated to the support member, the electrical component being adversely affected by heating to a temperature above a predetermined level; a ferrous base metal ring member hermetically mounted in the circular groove on the upper surface of the peripheral flange of the support member, the ring member having a narrow circular projection extending above the upper surface of the flange; a header element containing an insulating segment and an electrical conductor passing through the insulating segment, the header element having a laterally extending ferrous base metal flange adapted to fit against the circular ring member, the laterally extending ferrous base metal flange being welded to the circular ring member to cooperate with the support member to provide a hermetic enclosure for the electrical component between the header member and the support member, the amount of heat developed during the welding of the ferrous flange to the narrow projection of the ferrous circular ring member being so small that the temperature of the electrical component does not reach the predetermined level which adversely affects the electrical component; a stud extending from the opposite surface of the support member for mounting the member on a heat sink.

5. In the method of fabricating a sealed electrical device, the steps comprising inserting a ferrous base metal circular ring into a circular groove peripherally disposed in the upper surface of the peripheral flange of a support member, the ring presenting a relatively narrow projection extending above the flange surface, the circular ring being fitted into the groove to provide a hermetic joint therebetween, the support member being of a metal selected from the group consisting of copper, copper base alloys, silver, silver base alloys, and aluminum and aluminum base alloys; attaching an electrical component to the support member within the periphery thereof; disposing a header member having a laterally extending flange over the base so that the flange is in contact with the projection of the ring, and welding the flange to the ring at said projection to provide a hermetically sealed chamber, the amount of heat developed during the welding of the flange to the projection of the ring being so small that the temperature of the electrical component does not reach a predetermined level which adversely affects the electrical component.

6. In the method of fabricating a sealed electrical device, the steps comprising inserting a ferrous base metal circular ring into a circular groove peripherally disposed in the upper surface of the peripheral flange of a support member, the ring presenting a relatively narrow projection extending above the flange surface, the circular ring being fitted into the groove to provide a hermetic joint therebetween, the support member having a centrally disposed flat area circumscribed by the peripheral flange with a circular channel between the flat area and the flange, the support member being of a metal selected from the group consisting of copper, copper base alloys, silver, silver base alloys, and aluminum and aluminum base alloys; soldering a semiconductor member to the centrally disposed flat area of the support member; disposing a header member having a laterally extending flange over the base so that the flange is in contact with the projection of the ring, and welding the flange to the ring at said projection to provide a hermetically sealed chamber, the amount of heat developed during the welding of the flange to the projection of the ring being so small that the temperature of the electrical component does not reach a predetermined level which adversely affects the electrical component.

References Cited in the file of this patent

UNITED STATES PATENTS

| | | |
|---|---|---|
| 2,134,578 | Remscheid | Oct. 25, 1938 |
| 2,725,505 | Webster et al. | Nov. 29, 1955 |
| 2,825,014 | Willemse | Feb. 25, 1958 |
| 2,864,980 | Mueller et al. | Dec. 16, 1958 |
| 2,880,383 | Taylor | Mar. 31, 1959 |
| 2,887,628 | Zierdt | May 19, 1959 |